INVENTORS.
ROBERT M. HILL
DANIEL E. KAPLAN
BY
George C. Sullivan
Agent

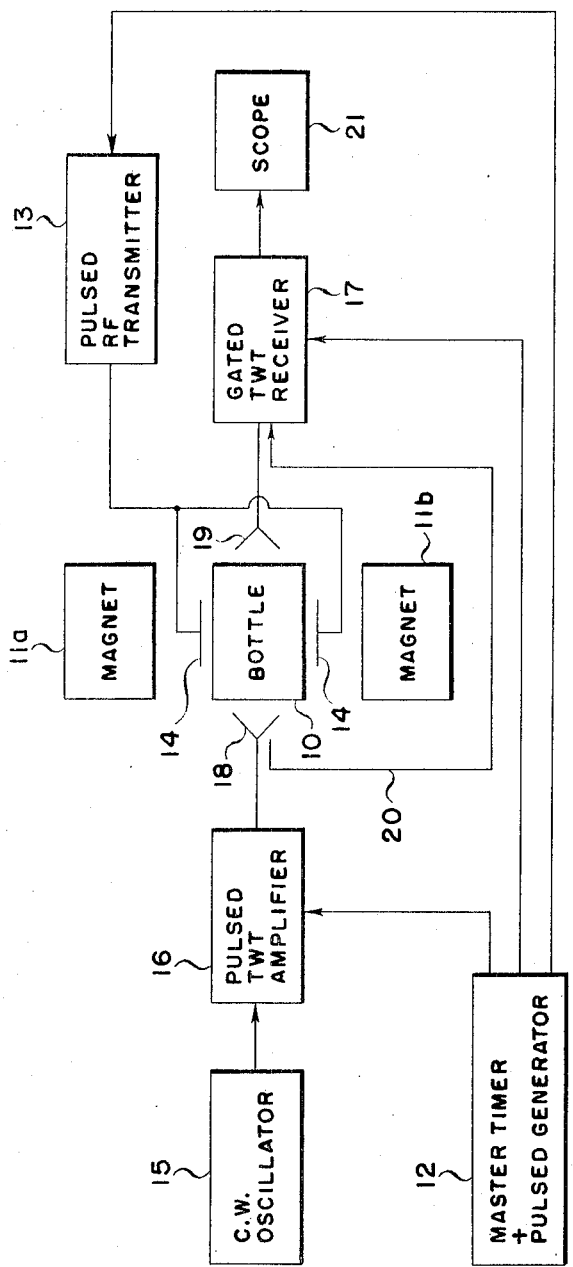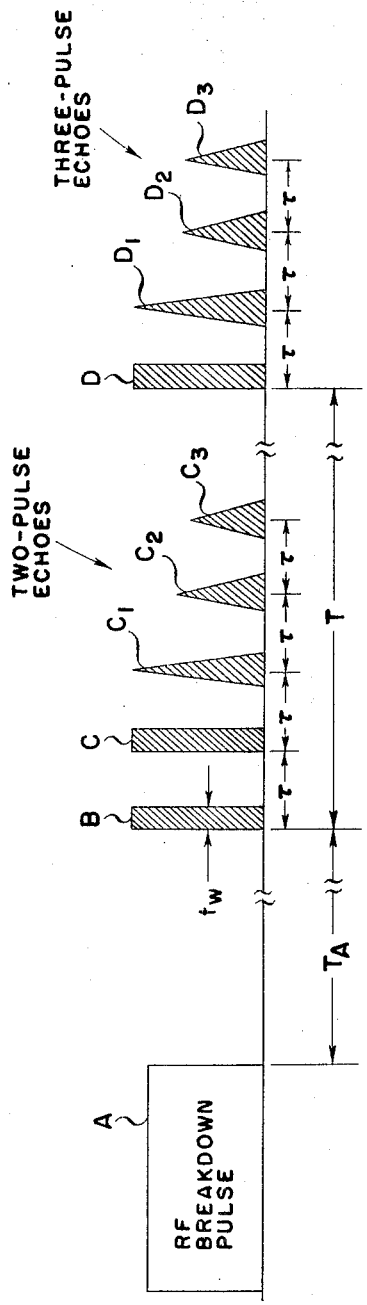

United States Patent Office

3,513,382
Patented May 19, 1970

1

3,513,382
OBTAINING TIME DOMAIN INFORMATION FROM DYNAMICAL PROCESSES IN A PLASMA
Robert M. Hill, Palo Alto, and Daniel E. Kaplan, Los Altos Hills, Calif., assignors to Lockheed Aircraft Corporation, Burbank, Calif.
Filed Aug. 18, 1967, Ser. No. 661,647
Int. Cl. G01n 27/78
U.S. Cl. 324—.5                                                          4 Claims

ABSTRACT OF THE DISCLOSURE

An arrangement for obtaining time domain information from dynamical processes in a plasma in which a sequence of three pulses at the cyclotron resonance frequency of a cyclotron resonant species in the plasma is applied to the plasma. These pulses affect the relative phasing of this species in such a manner that velocity-dependent interactions of the species cause the formation of macroscopic moments in the plasma which generate echo signals after the second pulse and also after the third pulse. The decay envelope of the signals received after the second pulse provides information indicative of the relaxation of the momentum of the species, and the decay envelope after the third pulse provides information indicative of the relaxation of the energy of the species.

BACKGROUND OF THE INVENTION

The present invention relates to the use of resonant echo techniques for obtaining time domain information from dynamical processes in a plasma.

The measurement and monitoring of dynamical processes in plasma is of fundamental importance both for scientific research and for the application of plasmas to thermonuclear generation, data processing, and other technologies. Heretofore such measurements have been extremely difficult to make on a real time or time domain basis. Usually so-called "swarm" techniques have been used in which such properties are inferred from thermal or other time-integrated measurements, such techniques being undesirably limited in sensistivity, accuracy, resolution, and frequency-response.

In accordance with the present invention, there is provided a novel technique for obtaining time domain information from dynamical processes in a plasma. Indications of such plasma properties as energy and momentum transfer and diffusion may thereby be obtained which are of interest both in monitoring directly the properties of a plasma and in monitoring the effect on the plasma of external perturbations such as resonant excitation of a coupled particle species, thermal agitation of the plasma, and variations in the magnetic or electric field or field gradient to which the plasma is exposed.

SUMMARY OF THE INVENTION

The present invention is based upon the discovery that the formation of resonant echo signals in plasmas results from nonlinearities of relaxation mechanisms of the plasma species undergoing resonance, and that the echo signals so obtained may therefore be used as a time-domain indicator of dynamical processes in the plasma. In more specific aspects of the invention, the decay envelope of two-pulse echo signals is used to monitor the relaxation of the momentum of the resonant species, and the decay envelope of three-pulse signals is used to monitor the relaxation of the energy of said species.

DESCRIPTION OF DRAWING

The various features and advantages of the present invention will become more apparent upon a considera-

Figure 3:
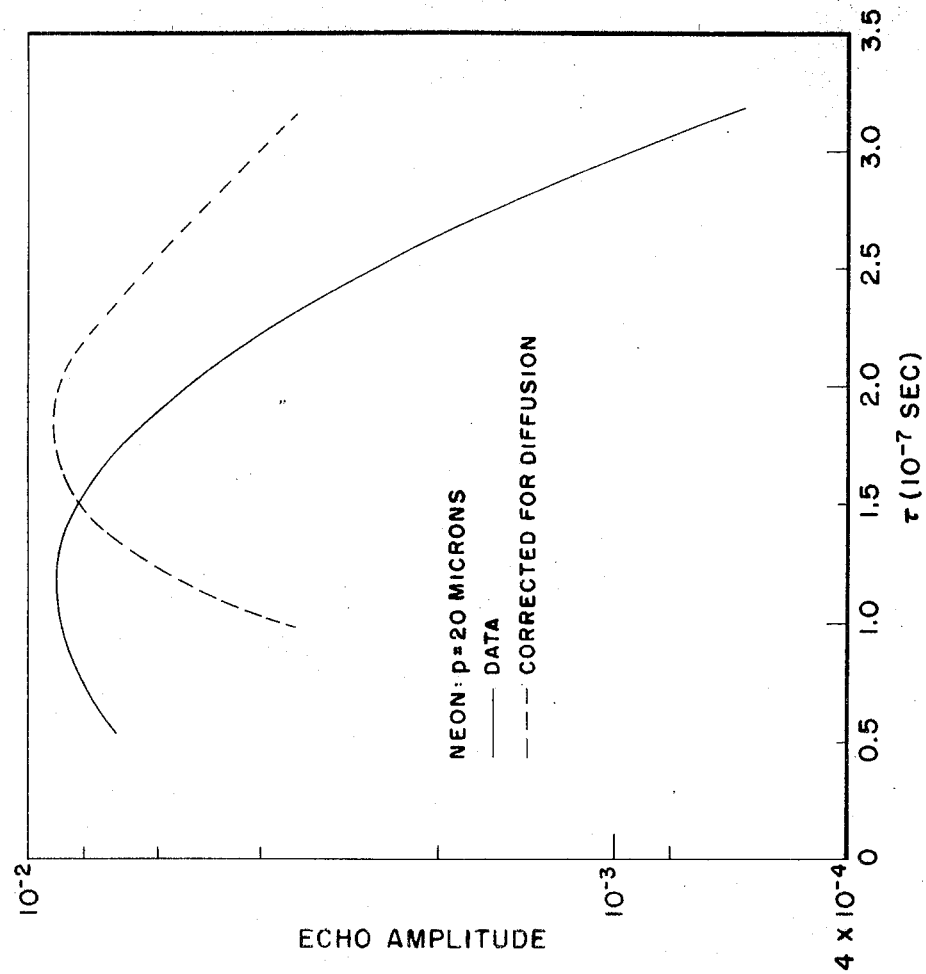
Figure 5:
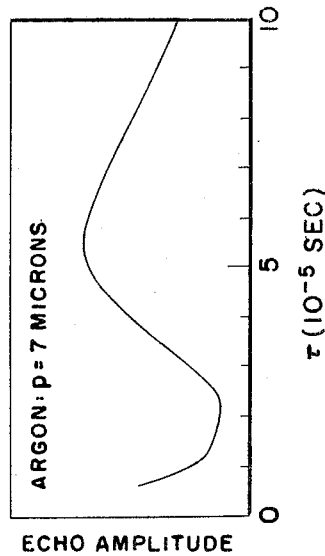
Figure 4:
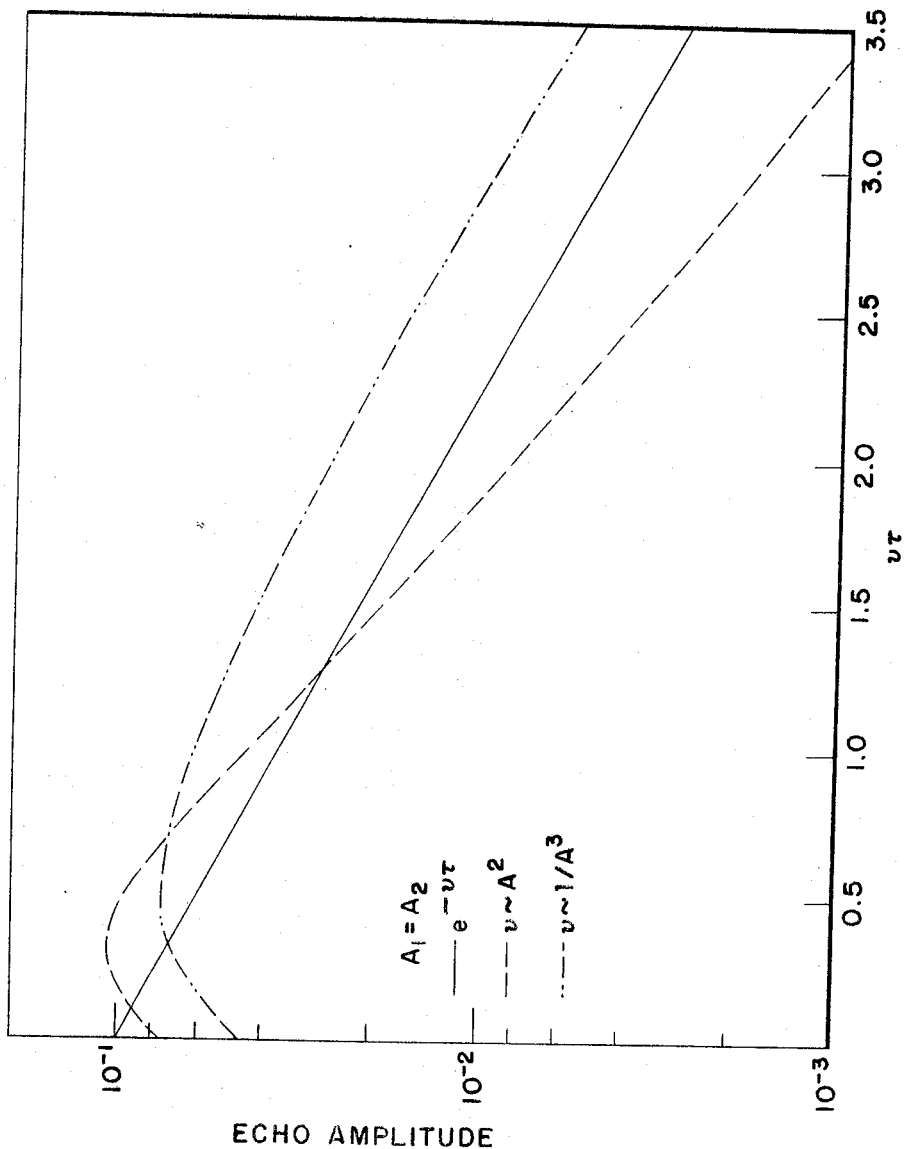

2 tion of the following description, taken in connection with the accompaying drawings, wherein:

FIG. 1 is a block diagram of apparatus for monitoring the cyclotron resonance of electrons in accordance with the present invention;

FIG. 2 is an amplitude versus time plot for showing the time sequence of pulses in the apparatus of FIG. 1;

FIG. 3 is a plot of the two-pulse echo decay envelope in a neon plasma sample at a pressure of 20 microns, as measured and corrected for diffusion in accordance with the present invention;

FIG. 4 is a plot of two-pulse echo decay envelopes for a model of echo formation by velocity dependent collisions in accordance with the present invention; and FIG. 5 is a plot of the three-pulse echo delay envelope in an argon plasma sample at a pressure of 7 microns, in accordance with the present invention.

DESCRIPTION OF THE PREFERRED EMBODIMENTS

In the following description, we will consider, for purposes of illustration, cyclotron resonance of free electrons. However, as will be understood by those skilled in the art, the techniques described are generally applicable to other natural resonances of resonant species in plasmas, in both the gaseous and solid state, including resonances of ions as well as electrons and including collective normal mode resonance as well as single particle resonance.

FIG. 1 discloses a typical apparatus for generating cyclotron resonance echoes in accordance with the present invention, where the cyclotron resonance frequencies of interest are in the microwave region. The plasma sample to be studied is placed in a bottle 10 in the static magnetic field established between the poles 11a and 11b of an electromagnet or premanent magnet. To initiate a plasma discharge in the bottle 10, a master timer and pulsed generator unit 12, which may include a blocking oscillator whose timing and sequencing is controlled by conventional laboratory pulse and delay generators, activates a pulsed R-F transmitter 13 which is capacitively coupled to the bottle 10 by capacitor plates 14. Typically the transmitter 13 generates a 1-millisecond pulse at a power level of approximately 500 watts and a frequency of 21 mc. across the plasma volume.

A master microwave oscillator 15 provides a continuous wave signal to the input of a traveling wave tube power amplifier 16 which is normally biased off. The timer and generator unit 12 provides grid pulses for gating on the amplifier 16, and for simultaneously gating off a sensitive, low-noise, traveling wave tube receiver 17 to prevent signal saturation effects from inhibiting the recovery of the receiver 17. The output pulses of the amplifier 16, typically 10 watts in power and 10 nanoseconds in duration, are radiated as plane waves by a microwave transmitting horn 18 into the plasma bottle 10. Upon termination of the input pulse from the amplifier 16, the receiver 17 is gated on in order to receive echo pulses from the plasma with positive propagation constants through a coupling device such as microwave receiving horn 19. Alternatively, the plasma bottle 10 may be contained directly in a waveguide and echo pulses which negative propagation constants coupled by a directional coupler 20 to the receiver 17. In either case, the echo signals entering the receiver 17 are detected and then amplified by video amplifiers for display on an oscilloscope 21.

FIG. 2 indicates the timing sequence for the events in the apparatus of FIG. 1. First, an R-F breakdown pulse A from the R-F generator 12 initiates a discharge in the plasma bottle 10. In the afterglow following this pulse, the electron and ion densities decay with time as a result of ambiopolar diffusion to the walls of the bottle 10. During this afterglow, a sequence of three microwave pulses B, C and D is applied at a frequency appropriate to a cyclotron resonance of the plasma medium.

For the case of cyclotron resonance of single free electrons in a gas discharge, the central cyclotron resonance frequency is:

(1) $\quad w_0 = eB/mc$ where:

e is the electronic charge,
m is the electronic mass
c is the speed of light, and
B is the value of the static magnetic field about which the electron orbits.

In FIG. 1, the field B is generated between the magnet poles 11a and 11b and the free electrons orbit about the direction of this field at their cyclotron resonance frequency.

Due to an inhomogeneous distribution of magnetic field or space charge effects, or both, the cyclotron resonance frequencies of the free electrons in the plasma are distributed over a bandwidth $\Delta w_c$. The bandwidth of the pulses B, C and D is greater than $\Delta w_c$ and the electric field of the pulses is in the plane of the cyclotron orbit so as to couple to the electron motion and create a state of phase coherence among the electrons at an energy elevated above the thermal level. For a pulse width $tw$ of 10 nanoseconds, for example, the Fourier frequency distribution is in excess of 200 mc. which provides an essentially uniform excitation for electrons resonant over a frequency bandwidth of this order. The phase coherent state created by the first pulse B is equivalent to the existence of a large macroscopic electric dipole moment, which will radiate with intensity $n$ times greater than the incoherent radiation associated with an $n$-electron ensemble. The phase coherence and hence the radiation intensity will diminish following the pulse B at a maximum rate $\Delta w_c$. After a time $\tau \gg \Delta w_c^{-1}$, when the coherent radiation has effectively ceased, the second pulse C is applied. Pulse C creates a new phase coherent state for the $n$ electrons which again diminishes due to natural dephasing processes.

At time intervals of $\tau$ following the second pulse, coherent phase states reoccur with a resultant burst of radiation due to the associated macroscopic dipole moment, thereby generating echo pulses $C_1$, $C_2$, $C_3$, etc., which are designated as two-pulse cyclotron echoes. Application of the third pulse D at a time $T > 2\tau$ will cause a similar formation of phase coherent states at intervals of time $\tau$ following the pulse D, thereby generating echo pulses $D_1$, $D_2$, $D_3$, etc., which are designated as three-pulse cyclotron echoes.

In accordance with the present invention, the timing unit 12 is varied so that the amplitude of the echo signals can be observed on the oscilloscope 12 as a function of the pulse spacings $\tau$ and T. This observation gives rise to an echo decay envelope which is used to make time domain measurements of energy and momentum transfer processes and diffusion processes in a plasma. Such measurements follow as a consequence of our discovery that the decay envelopes for resonance echoes in a plasma have a complex nonmonotonic form which is indicative of the fact that these plasma effects contribute directly to the formation, as well as the decay, of the echo signal. A typical such decay envelope is shown by the solid line curve in FIG. 3, this curve having been derived from the free electrons in a sample of neon at 20 microns pressure by observing the amplitude of the first two-pulse echo ($C_1$ in FIG. 2) as a function of the time separation $\tau$ between the two pulses (B and C in FIG. 2).

To better understand these relationships, we will now present an analysis of a large collection of electrons in a slightly nonuniform magnetic field B along the z direction, such that the cyclotron orbiting or gyro-frequencies of the electrons are spread in a narrow range $$|w_c - w_0| < (\Delta w)_{max}.$$

about a central frequency $w_0$. The electrons interact with a series of electromagnetic pulses of duration $t_w$ which propogate along the $x$ direction and whose electric field is along the $y$ direction, where $x$, $y$ and $z$ are mutually perpendicular directions. For purposes of this initial analysis, it is assumed: that the plasma has a sufficiently low density of charged particles that space charge interactions can be neglected; that the electrons are initially at rest; that the pulse duration $t_w$ is very short compared with $(\Delta w)_{max}^{-1}$ so that the relative phase shifts among different electrons can be ignored for the duration of a pulse; that the intervals $\tau$ between pulses are long compared to $\Delta w_{max}^{-1}$ so that electron phase angles at the arrival of a given pulse are approximately evenly distributed between 0 and $2\pi$; and that the drifting of electrons along magnetic field lines is negligible. Solution of the equations of motion then gives the following expression for the magnitude of the dipole moment $\mu$ which generates the two-pulse echoes ($C_1$, $C_2$, $C_3$ in FIG. 2):

(2) $\quad \mu = (N/2\pi) \int_0^{2\pi} Q(\theta)[A_1 \exp ni\theta + A_2 \exp (n-1)i\theta]d\theta$ where:

$\theta = (\tau)(\Delta w) - 2\pi s$ ($s$ is an integer); $0 \leq \theta \leq 2\pi$) is the phase of each electron at the time $\tau$ of the second pulse C relative to the phase of an electron orbiting at the exact central frequency $w_0$,
N is the total number of electrons in the plasma,
$A_1$ is the velocity imparted to the electrons by the first pulse B,
$A_2$ is the velocity imparted to the electrons by the second pulse C,
$n$ is an integer representative of the time of the echo pulse; for pulse $C_1$, $n=2$, for pulse $C_2$, $n=3$, for pulse $C_3$, $n=4$, etc., and
$Q(\theta)$ is a nonlinear factor which depends in general on $A_1$, $A_2$, $\tau$ and $n$, as well as $\theta$.

In Equation 2, the integral reduces to zero if the nonlinear factor $Q(\theta)$ is omitted. This results from the fact that the energy states for the cyclotron resonance of free electrons (and other particles) in a palsma, unlike two-level quantum systems, form a continuum of equally spaced energy levels of high quantum number, analogous to a classical harmonic oscillator, so that no echoes are observed in the absence of a nonlinear process represented in Equation 2 by the factor $Q(\theta)$. Various such nonlinear processes have been postulated. We have discovered from studying the cyclotron echo pulses from a wide variety of plasmas that a velocity dependent collision frequency mechanism, which is a nonlinear relaxation mechanism, dominates the formation of the cyclotron echoes in such a manner that cyclotron echo apparatus can be used as a diagnostic probe for these plasmas. The following discussion of the relationships for such plasmas will suggest the general applicability of the use of echo signals formed by nonlinear relaxation mechanisms for obtaining time domain information from dynamical processes in a plasma.

The form of the nonlinear factor $Q(\theta)$ for velocity dependent collisions of electrons with ions and neutral atoms or molecules, is given by:

(3) $\quad Q(\theta) = [\exp - \nu(A_1)\tau][\exp - \nu(V_2)\tau]$ where:

$\nu$ is the collision frequency for momentum transfer (the rate at which a moving ensemble of electrons or other cyclotron resonant particles loses its momentum) and is a function of the particle velocity V, and $V_2 = A_1 \exp i\theta + A_2$, is the velocity of electrons upon termination of the second pulse C.

The first factor in Equation 3 represents the attenuation of the moment through collisions during the interval $0 < t < \tau$ between pulses B and C, and is common to all electrons. The second factor represents the attenuation of the moment during the interval $\tau < t < 2\tau$ between pulse C and the echo pulse $C_1$, and is a function of the phase $\theta$ of the electrons, relative to the electrons at the central frequency $w_o$, at the termination of the second pulse C.

FIG. 4 is a semilog plot of the form of echo envelope derived from Equations 2 and 3 where $\nu(A) \sim A^2$ (dashed line) and $\nu(A) \sim A^{-3}$ (dot-dash line), with the amplitude of the two pulses B and C being equal so that $A_1 = A_2$. The echo amplitude is plotted versus $\nu\tau$ with a simple exponential $e^{-\nu\tau}$ (solid line) shown for comparison. The collision frequency function $\nu(A) \sim A^2$ would be a good approximation for electron-argon atom collisions, and the collision frequency function $\nu(A) \sim A^{-3}$ would be a good approximation for electron-ion or Coulomb collisions. The Coulomb collision case (dot-dash line) shows a relatively slow rise in echo amplitude, peaking at $\nu(A_1) \sim 0.5$ and followed by an $e^{-\nu\tau}$ decay. This is attributable to the fact that the high-velocity electrons which contribute the most to the echo moment collide very slowly and the echo decay is determined primarily by the loss rate $\nu(A_1)$ between the pulses B and C. The case $\nu \sim A^2$ (dashed line), for which the collision rate increases with electron velocity, exhibits a more rapid rise followed by a decay which is initially steeper than $e^{-\nu\tau}$, but approaches $e^{-\nu\tau}$ for large $\nu\tau$, this behavior representing the rapid initial loss of high-velocity electrons.

Solution of Equations 2 and 3 for unequal amplitude of pulses ($A_1 \neq A_2$) also shows interesting, but more complex, behavior of the echo envelope. For the case $\nu \sim A^2$, the collision rate between pulses B and C increases as $A_1^2$ and for large enough values of $\nu\tau$ the echo actually decreases with increasing $A_1$. This saturation effect has been observed in both argon and neon. For the Coulomb case $\nu \sim A^{-3}$, a decrease in $A_1$ will cause a rise in $\nu$ and reduces the echo amplitude to a small value when $A_1/A_2 < 0.8$. For small $A_2/A_1$, the echo can have a zero as $\nu\tau$ is varied, due to changes in the phase of the echo signal relative to the exciting pulses. This phase change occurs well beyond the echo maximum for $\nu \sim A^2$. In practice what is observed is variation in echo amplitude as a strong function of $\tau$. For small $\tau$, the echo changes as $A_2^2$, but for longer $\tau$ the variation is much more rapid. The Coulomb case $\nu = A^{-3}$ shows the same behavior for small $A_2/A_1$, but the zero occurs before the echo peak. In practice, what is observed in this case is a very much steeper initial amplitude for short $\tau$ as $A_2$ is decreased, as well as a shift in the echo peak. Thus, it is apparent that it may be desirable to include in the pulsed generator 12 a provision for varying the relative amplitude of the pulses B and C in order to obtain additional diagnostic information regarding the plasma sample 10.

The discussion to this point has neglected the diffusion effect resulting from electron drift. For magnetic fields of sufficient intensity to produce cyclotron resonance frequencies in the microwave range, the electron drift is confined to a direction along the field lines. Under typical conditions, the nonuniformity of the field along this direction is considerable, even though smaller than in the transverse directions. In a typical time $\tau$, electrons at the edge of the container 10 advance in phase by several complete periods relative to electrons along the same field line at the center. Since thermal velocities carry the electrons through the inhomogeneous field, phases become scrambled, and this results in an attenuated echo. More explicitly, the moment of any class of electrons having a phase $\theta$ at $t = \tau$ decreases with $\tau$ by a factor which is independent of $\theta$ and thus serves as a general attenuation factor $\alpha$ for the total echo moment $\mu$. If it is assumed that in the region of interest, the electron density is uniform, the velocity distribution along the field direction $z$ is Maxwellian and independent of the transverse velocities excited by the pulses, and the boundary effects, which involve the motion of electrons into the interaction region from the outside, or the loss of electrons from the region, are negligible, the following expression is obtained for the attenuation factor $\alpha$:

(4)
$$\alpha = (2L)^{-1}(2/\pi)^{1/2}\sigma^{-1}\int_{-L}^{L} dZ \int_{0}^{\infty} dV Z \cos\phi \exp(-v_z^2/2\sigma^2)$$

where:

L is one-half the length of the interaction region along the $z$ direction, $v_z$ is the velocity of electrons in the $z$ direction, $\sigma = (kT/m)^{1/2}$ is the root mean square of $v_z$ for a Maxwellian distribution, $$\phi = \int_0^\tau [f(z+v_z t) - f(z-v_z t)] dt, \text{ and}$$

$f(z)$ is the function describing the $z$ variation in the cyclotron frequency from the cyclotron frequency at $z = o$ in the middle of the interaction length $2L$.

In a desirable configuration, the plasma bottle 10 is centered in the magnetic field so as to minimize the field variations along the direction of the field, and since the field is almost uniform over the entire container, the field variation along the $z$ direction may then be adequately described by a parabolic equation so that the function $f(z)$ is of the form:

(5) $\qquad f(z) = bz^2$ where: $b$ is a constant.

Substituting Equation 5 into Equation 4, the form of the attenuation factor $\alpha$ for the parabolic field variation is:

(6) $\qquad \alpha = (2L)^{-1}\lambda$ where:

$\lambda = (\pi/2)^{1/2}(b\tau^2\alpha)^{-1}$ is the effective interaction length in the presence of electron drift.

It is seen from Equation 6 that increasing $\tau$ results in confining the length $\lambda$ of the region of coherent echo radiation to a narrower interval about the center of the container. The physical reason for this is that the variation of $w_c$ is more rapid at the edges than in the center of the container, and hence electron drift destroys phase coherence more effectively in the edge regions. The assumption of a uniform electron density in the interaction region, and the neglect of boundary effects are thus justified, since once the electron drift begins to affect the echo, only the central region remains important.

As previously mentioned, the solid line curve in FIG. 3 is a two-pulse echo decay curve taken from the oscilloscope 21 with a plasma sample 10 of neon at a pressure of 20 microns. The dashed line curve in FIG. 3 shows the same data corrected for diffusion according to Equation 6 where $b$ is taken as $10^7$ radians/cm.²/sec., a value appropriate to a uniform magnetic field region within a few millimeters of the midplane. The peak height is adjusted to the same value as the uncorrected data. The peak of this corrected curve occurs at $\tau = 170$ nanoseconds. In the dashed $\nu \sim A^2$ curve of FIG. 4, the peak amplitude occurs at $\nu\tau = 0.35$. Thus a measurement, in accordance with the present invention, of the collision frequency $\nu$ for neon at $20\mu$ is obtained, namely $$0.35 \div 170 \times 10^{-9} \text{ or } 2 \times 10^6$$

collisions per second. This measurement of collision frequency $\nu$, which represents the rate at which the momentum of the plasma is randomized, is taken at a known time interval and thus is a real time or time domain measurement.

Next we consider the formation of the three-pulse echoes ($D_1$, $D_2$, $D_3$, etc., in FIG. 2). In general, the mechanism producing the two-pulse echoes will also produce the three-pulse echoes. Solution of the equations of motion for the condition previously stated for the two-pulse echo gives the following expression for the dipole moment $\mu$ which generates the first three-pulse echo $D_1$ at time $T+\tau$:

(7)
$$\mu = (N/4\pi^2) \int_0^{2\pi} \int_0^{2\pi} [A_1 \exp i(2\theta+\psi) \pm A_2 \exp i(\mu+\psi) + A_3 \exp i\theta] Q(\theta,\psi) d\theta d\psi$$

where:
$\psi$ is the phase of each electron at the time of the third pulse D relative to the phase of a reference electron at the central cyclotron frequency $w_0$, and $Q(\theta, \psi)$ is again a nonlinearity factor.

Analogous expressions exist for the secondary echoes at $T+n\tau$ ($n$ is an integer). Generally, T is quite large compared with the average collision time so that by this time the momentum has been completely randomized or destroyed. However, these collisions provide only a slight change in the electron energy. Considering now the case where the dominant echo producing mechanism is a velocity-dependent function $Q(V_z)$, where $V_z = A_1 \exp i(\theta+\psi) + A_2 \exp i\psi + A_3$, is the velocity of electrons upon the termination of the third pulse D, $A_3$ being the velocity increment imparted to the electrons by the third pulse D, the Equation 7 then takes the form:

(8)
$$\mu = N/4 \int_0^{2\pi} d\psi \int_0^{2\pi} d\psi (V_2 \cos \psi + A_3) Q(V_3) \sin \theta \exp i\theta$$

It is significant that the three-pulse echo moment, as expressed in Equations 7 and 8, is not explicitly dependent upon relaxation due to randomization of the momentum in the period between the second and third pulses C and D. The important effect here is the loss of energy through collisions. This is not simply in the nature of a relaxation process, since collisions do not result in randomized energy. Rather, in each velocity class, the energy varies strictly with time according to the equation:

(9) $(d/dt)V^2(t) = -(2m/M)\nu_c(V)V^2(t)$ where:
M is the mass of the atom or ion with which the electron of mass $m$ collides at the collision rate $\nu_c$.

The form of the three-pulse echo moment as a function of rate of energy loss is then obtained by solving Equation 9 for the initial condition $V(\tau) = V_2$, and then substituting the final value $V(\tau)$ for $V_2$ in Equation 8.

The information of primary interest conveyed by the three-pulse echo $D_1$ is associated with its amplitude variation with the time T between the first pulse B and the third pulse D. Except for corrections which may be required as a result of diffusion processes, the form of the three-pulse echo envelope reflects, in real time, changes in the energy distribution of the electrons in the interval between the second and third pulses C and D. FIG. 5 shows a typical three-pulse cyclotron echo decay envelope as a function of T, from an argon plasma at a pressure of 7 microns and an electron density of $10^8/cm.^3$, interval $\tau$ being fixed at 200 nanoseconds. The echo amplitude initially decreases rapidly with increasing T, sometimes to zero amplitude for T of the order of 10 microseconds, followed by a slow rise to a second maximum at a much later time, which can be as long as 1 millisecond, and subsequently decreasing beyond the threshold for observation. The longest time T for which a three-pulse echo could be observed was 10 milliseconds in a so-called "A" plasma. A corollary of this is that the repetition rate for the three pulse sequence B, C, D, should not exceed $T_{max.}^{-1}$, where $T_{max.}$ is the longest time interval over which a three-pulse echo may be observed, without affecting the amplitudes of both two-pulse and three-pulse echoes.

For conditions in which very long three-pulse echo lifetimes are obtained, the maximum three-pulse echo amplitude occurs at earlier times. As the gas pressure is increased, the time at which the maximum echo amplitude occurs decreases monotonically until the echo becomes unobservable. This is expected from the collision model and provides a measure of the energy loss rate for electron-neutral collisions. A similar result is obtained for a fixed gas pressure by increasing electron density, indicating the effect of electron-electron collisions in randomizing electron energies. When $N_2$ is the parent gas for the plasma, the three-pulse echo lifetime is never longer than a few microseconds, indicating the effect of electrons losing energy more rapidly to vibrational and rotational excitation of the $N_2$ molecule.

The observations of the three-pulse echo envelopes as a function of T is in general agreement with the solution of Equation 8 for the idealized neon and Coulomb collision functions $\nu \sim A^2$ and $\nu \sim A^{-3}$, respectively. Zeros in the echo amplitude of the type found in the two-pulse case also occur for the three-pulse echo at small values of T. Another feature predicated by the collision model and observed in practice is the increase in echo amplitude as the second-pulse amplitude is decreased for small T values. Finally, it should be noted that diffusion serves to reduce the amplitude of the three-pulse echo as a function of $\tau$ whereby the decay of the three-pulse echo with increasing $\tau$ is more rapid than the decay of the two-pulse echo with $\tau$.

The cyclotron echo decays characteristic of echo formation by velocity dependent collision mechanisms, as described above, have been observed in a purely Coulomb plasma typified by a highly-ionized, thermally-generated cesium plasma as well as weakly-ionized plasmas as typified by pulsed afterglow excitation of the rare gases. Accordingly, it is apparent that the present invention is useful as a diagnostic probe of energy and momentum relaxation processes and of diffusion processes for a broad class of plasmas.

What is claimed is:

1. A method of obtaining time domain information from dynamical processes in a plasma, which comprises the steps of: applying a first sequence of pulses having a predetermined amplitude relation therebetween at the resonance frequency of a resonant species in said plasma to thereby effect the relative phasing of said species so that nonlinear relaxation mechanisms of said species cause the formation of macroscopic dipole moments in said plasma which generate echo pulse signals; obtaining a decay envelope of the amplitude of said echo pulse signals as a function of the time interval between said applied pulses of predetermined amplitude relation, said decay envelope being nonmonotonic in form with at least one maximum or minimum; obtaining information indicative of dynamical processes in said plasma from the location of said maximum or minimum, applying a second sequence of pulses having an amplitude relation therebetween other than said predetermined amplitude relation at the resonance frequency of a resonant species in said plasma to again effect the relative phasing of said species so that nonlinear relaxation mechanisms of said species again cause the formation of macroscopic dipole moments in said plasma which generate additional echo pulse signals; obtaining a second decay envelope of the amplitude of said additional echo pulse signals as a function of the time interval between said second sequence of pulses, said second decay envelope also being nonmonotonic in form with at least one second maximum or minimum; and obtaining information indicative of dynamical processes in said plasma from the location of said second maximum or minimum for comparison with said information indicative of dynamical processes in said plasma from the location of said first maximum or minimum.

2. Apparatus for obtaining echo signals from a plasma, comprising: means for containing a plasma; means for applying a sequence of pulses of radio frequency energy at the cyclotron resonance frequency of a resonant species in said plasma; means for detecting echo signals from said plasma; and means for varying the relative amplitude between individual pulses of said sequence of applied pulses.

3. The apparatus of claim 1 further comprising means for varying the time interval between individual pulses of said sequence of applied pulses.

4. The apparatus of claim 3 further comprising means for displaying the amplitude of said echo signals as a function of said time interval.

References Cited

R. M. Hill and D. E. Kaplan: Cyclotron Resonance Echo, Phys. Rev. Letters, 14(26), June 28, 1965, pp. 1062–1063.

Kaplan, D. E.: Magnetostatic Mode Echo for Ferromagnetic Resonance, Phys. Rev. Letters, 14(8), Feb. 22, 1965, pp. 254–256.

Dillon, J. F.: Magnetostatic Modes for Ferromagnetic Spheres, Phys. Rev., 112(1), Oct. 1, 1958, pp. 59–63.

RUDOLPH V. ROLINEC, Primary Examiner

M. J. LYNCH, Assistant Examiner

U.S. Cl. X.R.

315—111